United States Patent
Yun et al.

(10) Patent No.: US 11,463,122 B2
(45) Date of Patent: Oct. 4, 2022

(54) VEHICLE AND CONTROLLING METHOD OF THE VEHICLE

(71) Applicants: HYUNDAI MOTOR COMPANY, Seoul (KR); KIA MOTORS CORPORATION, Seoul (KR)

(72) Inventors: Jeong-gi Yun, Seoul (KR); Jongyoung Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 414 days.

(21) Appl. No.: 16/676,832

(22) Filed: Nov. 7, 2019

(65) Prior Publication Data
US 2021/0021295 A1 Jan. 21, 2021

(30) Foreign Application Priority Data
Jul. 15, 2019 (KR) .................. 10-2019-0085000

(51) Int. Cl.
*H04B 1/44* (2006.01)
*H04B 1/50* (2006.01)
*E05B 81/64* (2014.01)
*E05B 47/00* (2006.01)

(52) U.S. Cl.
CPC ............... *H04B 1/50* (2013.01); *E05B 81/64* (2013.01); *E05B 2047/0071* (2013.01)

(58) Field of Classification Search
CPC .......... H04B 1/3822; H04B 7/26; H04B 1/44; H04B 1/50; E05B 2047/0071; E05B 81/64
See application file for complete search history.

(56) References Cited

U.S. PATENT DOCUMENTS

| | | | | |
|---|---|---|---|---|
| 9,526,076 | B1* | 12/2016 | Park | H04W 4/40 |
| 10,395,460 | B2* | 8/2019 | Okada | H04W 4/20 |
| 2017/0008488 | A1* | 1/2017 | Matsumoto | H04W 12/06 |
| 2020/0005572 | A1* | 1/2020 | Ellis | G07C 9/00309 |

FOREIGN PATENT DOCUMENTS

| | | |
|---|---|---|
| JP | 2007-180622 A | 7/2007 |
| JP | 2009-280114 A | 12/2009 |
| JP | 2011-144624 A | 7/2011 |
| JP | 2015-208451 A | 11/2015 |
| KR | 2018-0099103 | 9/2018 |

OTHER PUBLICATIONS

Office action from Korean Application 10-2019-0085000, dated Aug. 20, 2020 (with translation).

* cited by examiner

*Primary Examiner* — Nhan T Le
(74) *Attorney, Agent, or Firm* — Slater Matsil, LLP

(57) ABSTRACT

Disclosed herein is a vehicle that includes a first communication module configured to receive a search signal of a user terminal through a data channel having a first frequency band, a second communication module configured to send a sensing signal to at least one of inside or outside of the vehicle through a second frequency band, and to receive a reflected signal corresponding to the sensing signal, and a controller configured to wake up the second communication module when the first communication module receives the search signal, determine a position of the user terminal based on the sensing signal and the reflected signal, and control the second communication module to operate in an operation mode that is determined based on at least one of the position of the user terminal or startup of the vehicle.

20 Claims, 6 Drawing Sheets

VEHICLE AND CONTROLLING METHOD OF THE VEHICLE

CROSS-REFERENCE TO RELATED APPLICATION(S)

This application claims priority to and the benefit of Korean Patent Application No. 10-2019-0085000, filed on Jul. 15, 2019, the entire contents of which are incorporated herein by reference.

FIELD

Embodiments and implementations of the present disclosure relate to a vehicle and a control method thereof.

BACKGROUND

The statements in this section merely provide background information related to the present disclosure and may not constitute prior art.

Recently, in addition to a key fob, a number of technologies using a handheld based user terminal for controlling a vehicle have been developed. In conventional technology for controlling a vehicle using a user terminal, a position of the user terminal is estimated through RF/LF communication, and a user or an object inside or outside the vehicle is detected through an ultrasonic sensor.

On the other hand, when using the RF/LF communication hacking case occurs through the relay equipment, and when using an ultrasonic sensor, a problem arises in that performance deterioration caused by a foreign substance occurs.

SUMMARY

In view of the above, it is an aspect of the present disclosure to provide a vehicle and a controlling method to perform wireless communication with a user terminal.

In one form of the present disclosure, a vehicle includes a first communication module configured to receive a search signal of a user terminal through a data channel having a first frequency band; a second communication module configured to send a sensing signal to at least one of an inside or an outside of the vehicle through a second frequency band, and to receive a reflected signal corresponding to the sensing signal; and a controller configured to wake up the second communication module when the first communication module receives the search signal, to determine a position of the user terminal based on the sensing signal and the reflected signal, and to control the second communication module to operate in an operation mode that is determined based on at least one of the position of the user terminal or a startup of the vehicle.

In some implementations, the controller is configured to determine the operation mode based on at least one of whether the user terminal is inside the vehicle, whether the vehicle is started, or whether the door is locked.

In some implementations, when the second communication module is activated, and the position of the user terminal is outside of the vehicle and the vehicle is in a start-off state, the controller is configured to control the second communication module to operate in a first mode for determining the position of the user terminal with respect to the outside of the vehicle.

In some implementations, when the position of the user terminal is inside of the vehicle and the vehicle is in a start-off state, the controller is configured to control the second communication module to operate in a second mode for determining the position of the user terminal with respect to the inside of the vehicle based on a door state.

In some implementations, the controller is configured to control the second communication module to operate in a third mode for detecting a user in the vehicle when the position of the user terminal is inside of the vehicle and the vehicle is a start-on state.

In some implementations, the controller is configured to send the sensing signal to the inside of the vehicle, and to control the second communication module to receive the reflected signal corresponding to the sensing signal from the user, and to determine a state of the user in the vehicle based on the sensing signal and the reflected signal.

In some implementations, the controller is configured to control the second communication module to operate in a fourth mode for detecting an object outside the vehicle based on a position of the gear lever when the position of the user terminal is inside of the vehicle and the vehicle is a start-on state.

In some implementations, when the position of the user terminal is outside of the vehicle and the vehicle is a start-off state, and when a door is changed from an unlocked state to a locked state, the controller is configured to control the second communication module to operate in a fifth mode for detecting an intrusion into the vehicle.

In some implementations, the controller is configured to authenticate the user terminal when the first communication module receives the search signal, and to activate the second communication module when the user terminal is authenticated.

In some implementations, the vehicle may further include a door locking device configured to lock a door or unlock the door; and the controller is configured to authenticate the user terminal when the position of the user terminal is within a predetermined region, and to control the door locking device to unlock the door when the user terminal is authenticated.

In some implementations, the vehicle may include a starting device configured to turn-on or turn-off the starting; and the controller is configured to determine whether the position of the user terminal is inside of the vehicle when the state of the door is changed from an open state to a closed state after the door is unlocked, and to control the starting device to turn-on the starting when the position of the user terminal is inside of the vehicle.

In some implementations, the first communication module utilize BLE (Bluetooth Low Energy).

In some implementations, the second communication module may utilize UWB (Ultra Wide Band).

In another form of the present disclosure, a method for controlling a vehicle includes receiving, with a first communication module, a search signal of a user terminal through a data channel having a first frequency band; waking-up a second communication module when the first communication module receives the search signal; transmitting a sensing signal through a data channel having a second frequency band to at least one of an inside or an outside of the vehicle, and receiving a reflected signal corresponding to the sensing signal; determining a position of the user terminal based on the sensing signal and the reflected signal; and operating in an operation mode that is determined based on at least one of the position of the user terminal or a startup of the vehicle.

In some implementations, operating in the operation mode comprises determining the operation mode based on at least one of whether the user terminal is inside the vehicle, whether the vehicle is started, or whether the door is locked.

In some implementations, operating in the operation mode comprises when the second communication module is activated, and the position of the user terminal is outside of the vehicle and the vehicle is in a start-off state, operating in a first mode for determining the position of the user terminal with respect to the outside of the vehicle.

In some implementations, operating in the operation mode comprises when the position of the user terminal is inside of the vehicle and the vehicle is in a start-off state, operating in a second mode for determining the position of the user terminal with respect to the inside of the vehicle based on a door state.

In some implementations, operating in the operation mode comprises operating in a third mode for detecting a user in the vehicle when the position of the user terminal is inside of the vehicle and the vehicle is a start-on state.

In some implementations, operating in the operation mode comprises operating in a fourth mode for detecting an object outside the vehicle based on a position of the gear lever when the position of the user terminal is inside of the vehicle and the vehicle is a start-on state.

In some implementations, operating in the operation mode comprises, when the position of the user terminal is outside of the vehicle and the vehicle is in a start-off state, and when a door is changed from an unlocked state to a locked state, operating in a fifth mode for detecting an intrusion into the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

These and/or other aspects of the invention will become apparent and more readily appreciated from the following description of the embodiments, taken in conjunction with the accompanying drawings of which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, like reference numerals refer to like elements throughout the specification. This specification does not describe all elements of the embodiments and implementations, and in the technical field to which the present invention pertains, there is no overlap between the general contents or the embodiments. Terms such as "unit", "module", "member", and "block" may be embodied as hardware or software. According to embodiments and implementations, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments and implementations of the present disclosure will be described with reference to the accompanying drawings.

Figure 1:
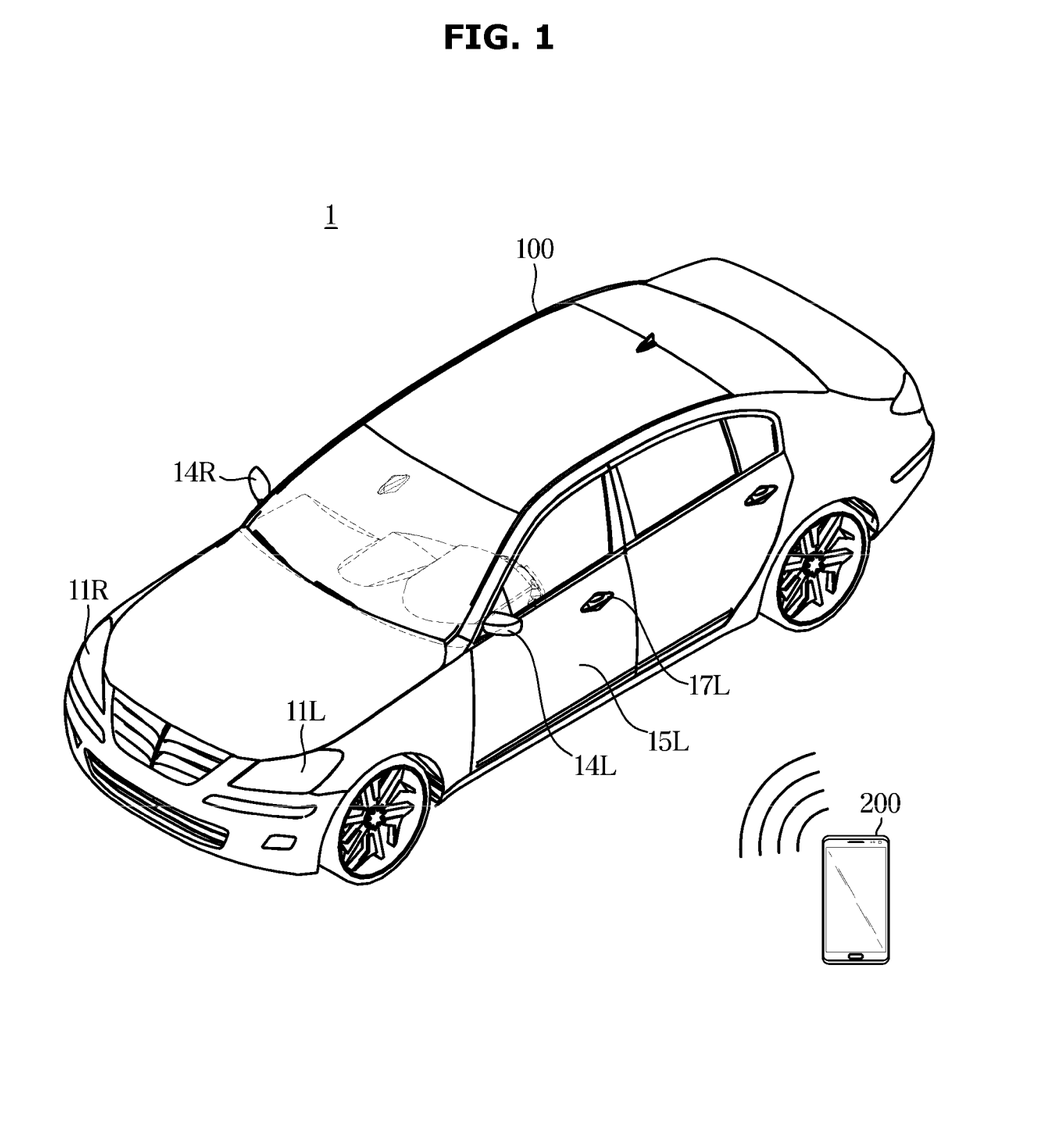
FIG. 1 is a view illustrating a relationship between a vehicle and a user terminal.

FIG. 1 is a view illustrating a relationship between a vehicle and a user terminal.

In FIG. 1, a vehicle 100 may receive a search signal from a user terminal 200 to provide various user convenience functions such as remote control of a user through the user terminal 200.

For example, when the touch sensing unit of the doors 15L and 15R detects the user's touch input while the user possesses the user terminal 200 registered in the vehicle 100, the vehicle 100 performs authentication with the user terminal 200 through a wireless communication network. And when the authentication is completed, the door lock of the vehicle 100 is released, and the doors 15L and 15R may be opened by the user's handles 17L and 17R pulling. Here, the user includes not only the driver but also a passenger in the vehicle 100, and means a person having a user terminal 200.

In addition, when the vehicle 100 has confirmed that the position of the user terminal 200 is close, a welcome light function, such as turning on the lamps provided in the headlights 11L and 11R of the vehicle 100 or the handles 17L and 17R, may be provided.

In order to provide such various user-friendly functions, the vehicle 100 may receive a search signal from the user terminal 200, and the location of the user terminal 200 may be identified based on the received search signal. In this case, the search signal may mean an advertising packet.

The user terminal 200 may be implemented as a computer or a portable terminal that can access the vehicle 100 through a network.

Here, the computer includes, for example, a laptop equipped with a web browser, a desktop, a laptop, a tablet PC, a slate PC, and the like. The portable terminal may include, for example, a wireless communication device that ensures portability and mobility, and includes all types of handheld based wireless communication devices such as personal communication system (PCS), a global system for mobile communications (GSM), a personal digital cellular (PDC), a personal handyphone system (PHS), and a PDA (PDA). Personal Digital Assistant (IMT), International Mobile Telecommunication (IMT)-2000, Code Division Multiple Access (CDMA)-2000, W-Code Division Multiple Access (W-CDMA), Wireless Broadband Internet (WiBro) terminal, Smart Phone, and wearable devices such as watches, rings, bracelets, anklets, necklaces, glasses, contact lenses, or head-mounted-devices (HMDs).

Figure 2:
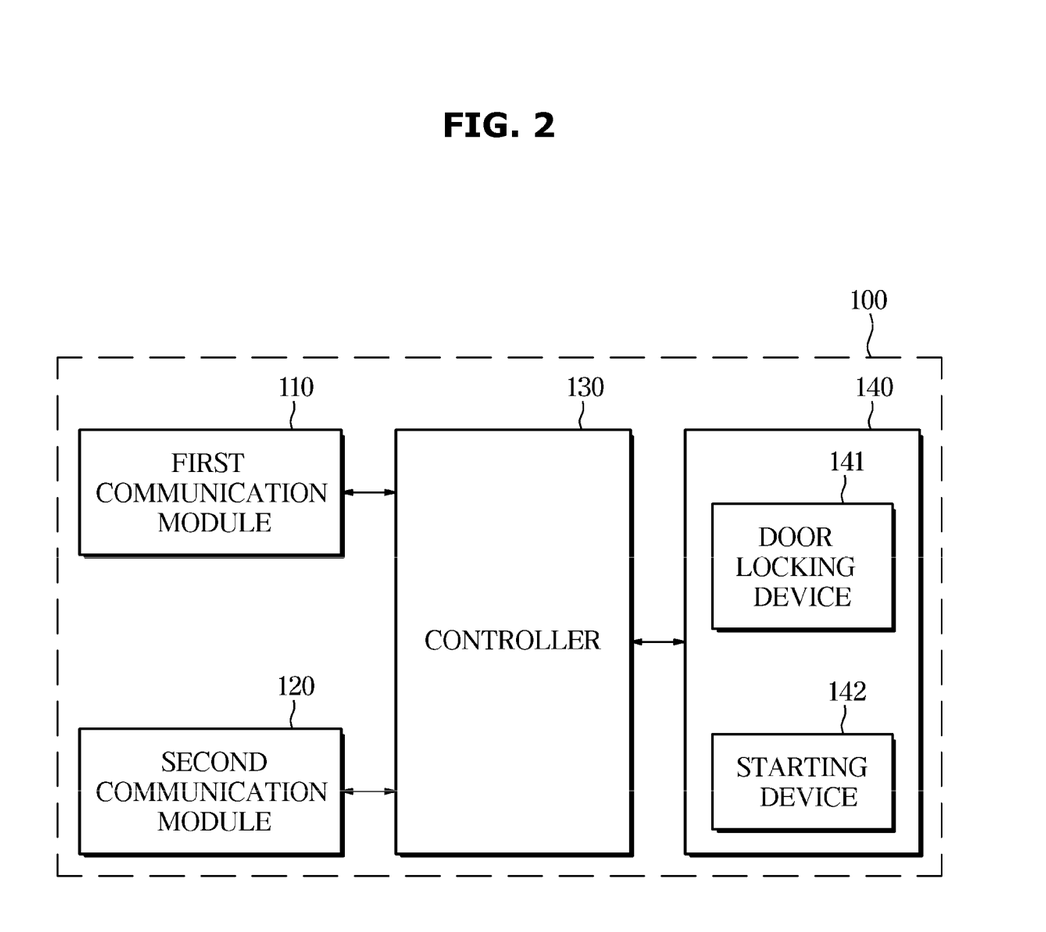
FIG. 2 is a control block diagram of a vehicle.
Figure 3:
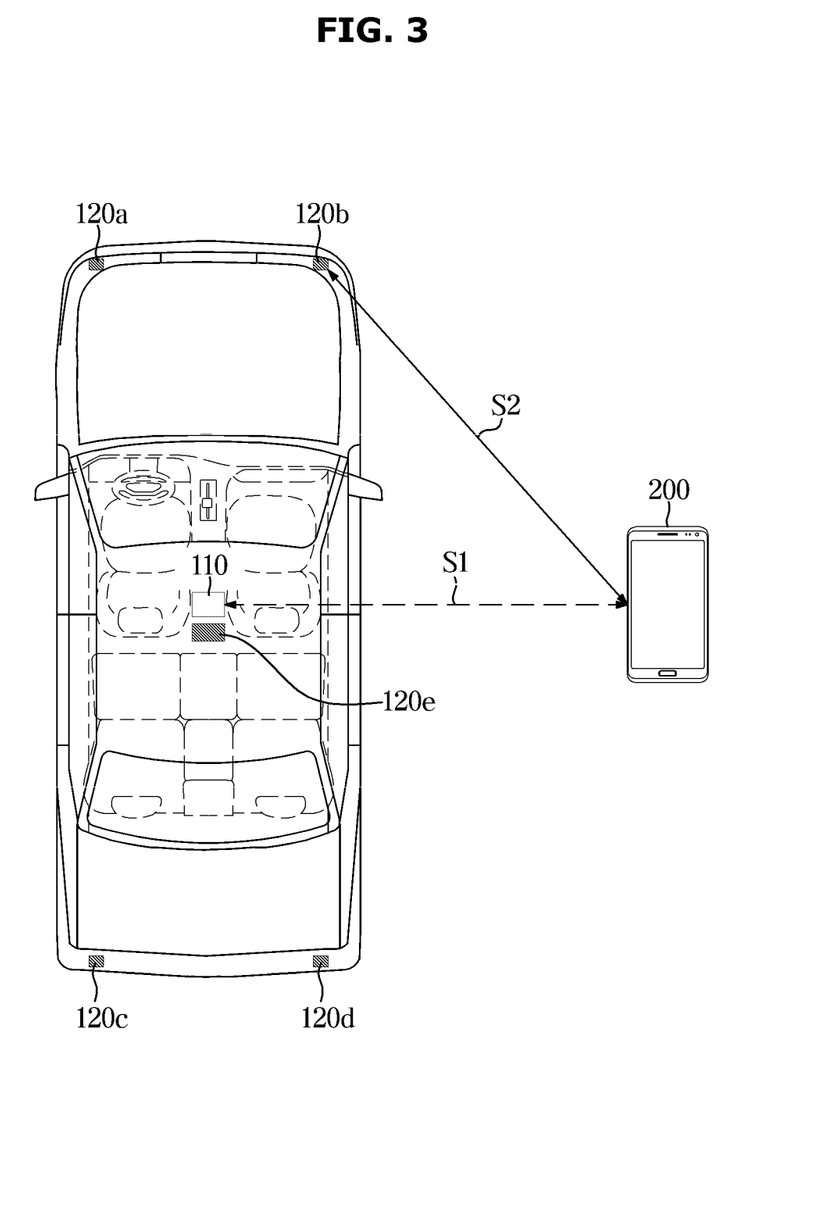
FIG. 3 is a diagram for describing an operation of a vehicle.

FIG. 2 is a control block diagram of a vehicle, and FIG. 3 is a diagram for describing an operation of a vehicle.

As shown in FIG. 2, the vehicle 100 includes a first communication module 110, a second communication module 120, a controller 130, and an electronic device 140.

The first communication module 110 may receive a search signal of the user terminal 200 through a data channel having a first frequency band.

In this case, the first communication module 110 may be implemented as a wireless communication module. For example, the first communication module 110 may be implemented as a BLE module. In this case, the first communication module 110 may receive a search signal transmitted by the user terminal 200 through a data channel of about 2.4 GHz.

Meanwhile, the first communication module 110 may be connected to a constant power source to receive power regardless of the start of the vehicle 100, and the constant power source may include a battery.

The second communication module 120 may transmit the sensing signal to the inside or the outside of the vehicle through a data channel having the second frequency band, and receive the reflected signal corresponding to the sensing signal. The second communication module 120 may receive a reflected signal corresponding to the sensing signal from an object located inside or outside the vehicle, and objects located inside or outside the vehicle may include a user, an obstacle, and the like, as well as the user terminal 200.

In this case, the second frequency band may be a frequency band having a wider bandwidth than the first frequency band of the first communication module 110. However, the present disclosure is not limited thereto and may be a frequency band having the same or narrow bandwidth.

The second communication module 120 may be implemented as a wireless communication module, for example, may be implemented as an ultra-wide band (UWB) communication module. When the second communication module 120 is implemented as a UWB module, the second communication module 120 may transmit a sensing signal through a data channel of a frequency band of about 3.1 GHz to 10.6 GHz.

In this case, the sensing signal may be a pulse signal or an impulse signal. However, the present disclosure is not limited thereto and may include various types of signals.

Meanwhile, the first communication module 110 or the second communication module 120 may be disposed inside or outside the vehicle 100 and may be provided in plurality.

In addition, the first communication module 110 and the second communication module 120 are not limited to the above-described example, and may include one or more components that enable communication with an external device such as a user terminal 200. For example, the first communication module 110 and the second communication module 120 may include at least one of a short range communication module, a wired communication module, and a wireless communication module.

The short range communication module may include various local area communication modules for transmitting and receiving signals using a wireless communication network such as a Bluetooth module, an infrared communication module, a radio frequency identification (RFID) communication module, a wireless local access network (WLAN) communication module, an NFC communication module, a zigbee communication module, or the like.

The wired communication module can be a variety of wired devices such as a controller area network (CAN) module, a local area network (LAN) module, a wide area network (WAN) module, or a value added network (VAN) module, and also include various cable communication modules such as Universal Serial Bus (USB), High Definition Multimedia Interface (HDMI), Digital Visual Interface (DVI), returned standard232 (RS-232), power line communication, or plain old telephone service (POTS).

In addition to the Wifi module and the Wireless broadband module, the wireless communication module supports a wireless communication scheme such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), and Long Term Evolution (LTE).

The wireless communication module may include a wireless communication interface including an antenna for transmitting a signal and a transmitter. The wireless communication module may further include a signal conversion module configured to modulate the digital control signal output from the controller 130 into an analog type wireless signal through the wireless communication interface under the control of the controller.

The wireless communication module may include a wireless communication interface including an antenna for receiving a signal and a receiver. The wireless communication module may further include a signal conversion module for demodulating the analog signal received through the wireless communication interface into a digital control signal. Also, the wireless communication module may further include a signal conversion module for demodulating the analog signal received through the wireless communication interface into a digital control signal.

The electronic device 140 may include a device for driving various components inside the vehicle 100, and may include a door locking device 141 and a starting device 142.

The door locking device 141 may lock or unlock the doors 15L and 15R based on a control command of the controller 130.

The starting device 142 may turn on or off the starting. The starting device 142 may supply power to the driving motor or cut off power applied to the driving motor based on the control command of the controller 130.

The vehicle 100 may further include a start button (not shown) that receives a start command for starting the engine. The start button may receive a start command for starting the engine from the user, and receive a start off command from the user when the vehicle is stopped.

The controller 130 may wake-up the second communication module 120 when the first communication module 110 receives the search signal. The location of the user terminal 200 may be determined based on the sensed signal and the reflected signal.

In detail, when the first communication module 110 receives the search signal, the controller 130 may activate the second communication module 120 in an inactive state. When the second communication module 120 is activated, the second communication module 120 may transmit a sensing signal and receive a reflected signal corresponding to the sensing signal.

In this way, the controller 130 may increase power efficiency by activating the second communication module 120 only when the first communication module 110 receives the search signal.

The controller 130 may determine the location of the user terminal 200 based on the sensing signal transmitted by the second communication module 120 and the reflected signal corresponding thereto.

In detail, the controller 130 may determine the location of the user terminal 200 using a time of flight (ToF) method. In addition, the controller 130 may determine the location of the user terminal 200 using a time of arrival (TOA), a time difference of arrival (TDOA), an angle of arrival (AOA), or a received signal strength indicator (RSSI) method.

In addition, when the first communication module 110 receives the search signal, the controller 130 may authenticate the user terminal 200. If the user terminal 200 is authenticated, the controller 130 may complete a communication connection with the user terminal 200 and exchange data with the user terminal 200.

In this case, the controller 130 may control the first communication module 110 to exchange data with the user terminal 200. Alternatively, the controller 130 may control the activated second communication module 120 to exchange data with the user terminal 200.

In addition, the controller 130 may activate the second communication module 120 when the user terminal 200 is authenticated. Through this, the controller 130 may prevent the second communication module 120 from being activated from the access of an unauthorized user terminal, and may prevent battery discharge and increase power efficiency.

In addition, the controller 130 may determine an operation mode based on at least one of the location or a startup of the user terminal 200, and may control at least one component inside the vehicle 100 to perform the determined operation mode.

In detail, the controller 130 may determine an operation mode based on at least one of whether the location of the user terminal 200 is inside the vehicle, whether the vehicle is started, or whether the door is locked. More specific description thereof will be described later.

On the other hand, the controller 130 may be implemented by a memory (not shown) for storing the data for the algorithm or algorithm for controlling the operation of the components in the vehicle 100, and a processor (not shown) for performing the above-described operation using the data stored in the memory. In this case, the memory and the processor may be implemented as separate chips. Alternatively, the memory and the processor may be implemented in a single chip.

At least one component may be added or deleted to correspond to the performance of the components of the vehicle 100 illustrated in FIG. 2. In addition, it will be readily understood by those skilled in the art that the mutual position of the components may be changed corresponding to the performance or structure of the system.

Meanwhile, each component illustrated in FIG. 2 refers to a software and/or a hardware component such as software and/or a field programmable gate array (FPGA) and an application specific integrated circuit (ASIC).

FIG. 3 is a diagram for describing an operation of a vehicle.

Referring to FIG. 3, the vehicle 100 may include a first communication module 110 and a second communication module 120*a* to 120*e* capable of communicating with the user terminal 200.

The second communication module 120*a* to 120*e* may be provided in plural and may be provided at an external or internal location suitable for transmitting and receiving signals.

When the first communication module 110 receives the search signal S1 from the user terminal 200, the controller 130 may activate the second communication modules 120*a* to 120*e*. In this case, the controller 130 may activate only the second communication modules 120*a*, 120*b*, 120*c*, and 120*d* disposed outside the vehicle. However, the present disclosure is not limited thereto, and at least one of the plurality of second communication modules 120*a* to 120*e* may be activated.

When the location of the user terminal 200 is the outside of the vehicle and the start-off state, and when the second communication modules 120*a* to 120*e* are activated, the controller 130 may control the second communication module 200 to perform a first mode for determining the location of the user terminal 200 with respect to the outside of the vehicle. In this case, the first mode refers to an operation mode for determining the position of the user terminal 200 with respect to the outside of the vehicle.

In the first mode, the second communication modules 120*a* to 120*e* may transmit a sensing signal to the outside of the vehicle to determine the location of the user terminal 200 located outside the vehicle.

In order to perform the first mode, the controller 130 may activate the second communication modules 120*a* to 120*e*. In detail, the controller 130 may activate not only the second communication modules 120*a*, 120*b*, 120*c*, and 120*d* disposed outside the vehicle but also the second communication module 120*e* disposed inside the vehicle. However, the present disclosure is not limited thereto, and the controller 130 may activate only the second communication modules 120*a*, 120*b*, 120*c*, and 120*d* disposed outside the vehicle among the second communication modules 120*a* through 120*e*.

The controller 130 determines the location of the user terminal 200 relative to the outside of the vehicle based on a sensing signal transmitted by at least one of the second communication modules 120*a*, 120*b*, 120*c*, 120*d*, and 120*e* disposed outside and inside the vehicle and a reflection signal corresponding thereto.

The controller 130 may authenticate the user terminal 200 when the location of the user terminal 200 is within a predetermined first area, and control the door locking device 141 to unlock the door when the user terminal 200 is authenticated. In this case, the first area may mean an area in which it is estimated that the user opens the door to ride in the vehicle 100. For example, the first area may be defined as an area within a predetermined distance from the door.

The controller 130 may perform a second mode for determining the location of the user terminal 200 with respect to the inside of the vehicle based on the state of the door.

Specifically, if a change in the predetermined door state is detected after the door is unlocked, the controller 130 may perform a second mode for determining the location of the user terminal 200 with respect to the inside of the vehicle.

More specifically, if the state of the initial door state is switched from the closed state to the open state after the door is unlocked, the controller 130 may perform a second mode for determining the location of the user terminal 200 with respect to the inside of the vehicle.

Alternatively, after the door is unlocked, when the state of the first door is changed from the closed state to the open state and the start-off state, the controller 130 may perform the second mode.

In this case, the second mode refers to an operation mode for determining the position of the user terminal 200 with respect to the inside of the vehicle.

In the second mode, at least one of the second communication modules 120a to 120e disposed outside and inside the vehicle may transmit a sensing signal to the inside of the vehicle to determine the location of the user terminal 200 located inside the vehicle.

In order to perform the second mode, the controller 130 may activate the second communication modules 120a to 120e. In detail, the controller 130 may activate not only the second communication modules 120a, 120b, 120c, and 120d disposed outside the vehicle but also the second communication module 120e disposed inside the vehicle.

However, the present disclosure is not limited thereto, and the controller 130 may activate only the second communication module 120e disposed inside of the vehicle among the second communication modules 120a to 120e.

The controller 130 determines the location of the user terminal 200 relative to the inside of the vehicle based on a sensing signal transmitted by at least one of the second communication modules 120a to 120e disposed outside and inside the vehicle and a reflection signal corresponding thereto.

After the door is unlocked, when the state of the initial door state is changed from the closed state to the open state, and the position of the user terminal 200 is determined to be inside the vehicle, the controller 130 may control the starting device 142 to turn on the start.

After the door is unlocked, when the state of the initial door is changed from the closed state to the open state, and the position of the user terminal 200 is determined to be inside the vehicle, the controller 130 may control the starting device 142 to turn on the start.

If it is determined that the location of the user terminal 200 is within a second predetermined area of the vehicle, the controller 130 may perform authentication on the user terminal 200. If the user terminal 200 is authenticated, the controller 130 may control the starting device 142 to turn on.

Alternatively, the controller 130 may authenticate the user terminal 200 when the user inputs a start command through the start button, and once the user terminal 200 is authenticated, the startup device 142 can be controlled to turn on.

In addition, when the location of the user terminal 200 is inside of the vehicle and the vehicle is start-up state, the controller 130 may control the second communication modules 120a to 120e to perform a third mode for detecting a user in the vehicle. In this case, the third mode refers to an operation mode for acquiring information about the user in the vehicle.

In the third mode, the second communication modules 120a to 120e may transmit a sensing signal to the inside of the vehicle to sense the user inside the vehicle.

At this time, the controller 130 may activate only the second communication module 120e disposed inside the vehicle among the second communication modules 120a to 120e. The controller 130 may detect a user of the inside of the vehicle based on a sensing signal transmitted by the second communication module 120e disposed in the vehicle and a reflection signal corresponding thereto.

However, the present disclosure is not limited thereto, and the controller 130 may activate at least one of the second communication modules 120a to 120e. The controller 130 may sense a user for the inside of the vehicle based on a sensing signal transmitted by at least one of the second communication modules 120a to 120e disposed inside or outside the vehicle and a reflection signal corresponding thereto.

The controller 130 may determine not only whether the user exists in the vehicle but also the state of the user in the vehicle based on the sensing signal and the reflection signal corresponding thereto.

In detail, the controller 130 may determine the heart rate of the user based on the output values of the second communication modules 120a through 120e, and may classify the sleep state or the non-sleep state of the user based on the heart rate of the user.

In this case, the sensing signal transmitted by the second communication module 120a to 120e into the vehicle may be a signal using UWB communication. The controller 130 may determine the heart rate of the user by using a Doppler phenomenon of a sensing signal using UWB communication transmitted from the second communication modules 120a to 120e and an output value of the corresponding reflection signal.

The controller 130 may control various components inside the vehicle 100 based on the determined state of the user. For example, the controller 130 may determine that the user is in a sleep state when the determined heart rate of the user is less than or equal to the reference heart rate, and open a window.

In this way, the controller 130 may increase a user's convenience by providing a function suitable for a user's state.

In addition, when the position of the user terminal 200 is inside of the vehicle and the vehicle is in the start-up state, the controller 130 controls to perform the fourth mode for detecting an obstacle outside the vehicle based on the position of the gear lever. In this case, the fourth mode refers to an operation mode for detecting an obstacle outside the vehicle.

Specifically, when the position of the gear lever is in the D (drive) or R (reverse) position, the controller 130 controls the second communication modules 120a to 120e to perform a fourth mode for detecting an obstacle outside the vehicle.

In the fourth operation mode, the second communication modules 120a to 120e may transmit a sensing signal to the outside of the vehicle in order to detect an obstacle outside the vehicle.

In this case, the controller 130 may activate only the second communication modules 120a, 120b, 120c, and 120d disposed outside the vehicle among the second communication modules 120a through 120e. The controller 130 may determine the location of the obstacle and detect an obstacle outside the vehicle based on a sensing signal transmitted by the second communication modules 120a, 120b, 120c, and 120d disposed outside the vehicle and a reflection signal corresponding thereto.

However, the present disclosure is not limited thereto, and the controller 130 may activate at least one of the second communication modules 120a to 120e. The controller 130 may detect an obstacle outside the vehicle and determine a location of the obstacle based on a sensing signal transmitted by at least one of the second communication modules 120a to 120e disposed inside or outside the vehicle and a reflection signal corresponding thereto.

In this case, when the second communication modules 120a to 120e are implemented as UWB communication modules, more accurate position detection is possible than the ultrasound module, and the sensing area may be extended. Therefore, since obstacles such as road jaws can be detected more accurately, safety of driving can be increased.

In addition, when the position of the user terminal 200 is outside the vehicle and the vehicle is in start-off state, and when the door is changed from the unlocked state to the locked state, the controller 130 may perform a fifth operation mode for detecting an intrusion inside the vehicle. In this case, the fifth mode refers to an operation mode for detecting an intrusion inside the vehicle.

In the fifth mode, the controller 130 may control the second communication module 120a to 120e to transmit a sensing signal to the inside of the vehicle to detect the intrusion inside the vehicle.

In the fifth mode, when a movement of an object inside the vehicle is detected, the controller 130 may determine that an intrusion of the vehicle has occurred. If it is determined that an intrusion of the vehicle has occurred, the controller 130 may transmit a warning to the user terminal 200 or control the starting device 142 to maintain the turn-off state.

Through this, since theft of the vehicle 100 can be prevented, security and user convenience can be increased.

As described above, the controller 130 may provide various operation modes based on at least one of the position of the user terminal 200, whether the vehicle is started, the locked state of the door, or the gear lever position, and may change the operation mode. Therefore, since the function suitable for various situations can be provided, the user's convenience can be increased.

Meanwhile, at least one of the first to fifth operation modes described above may be simultaneously performed. However, the present disclosure is not limited thereto and may be performed at different times.

Figure 4A:
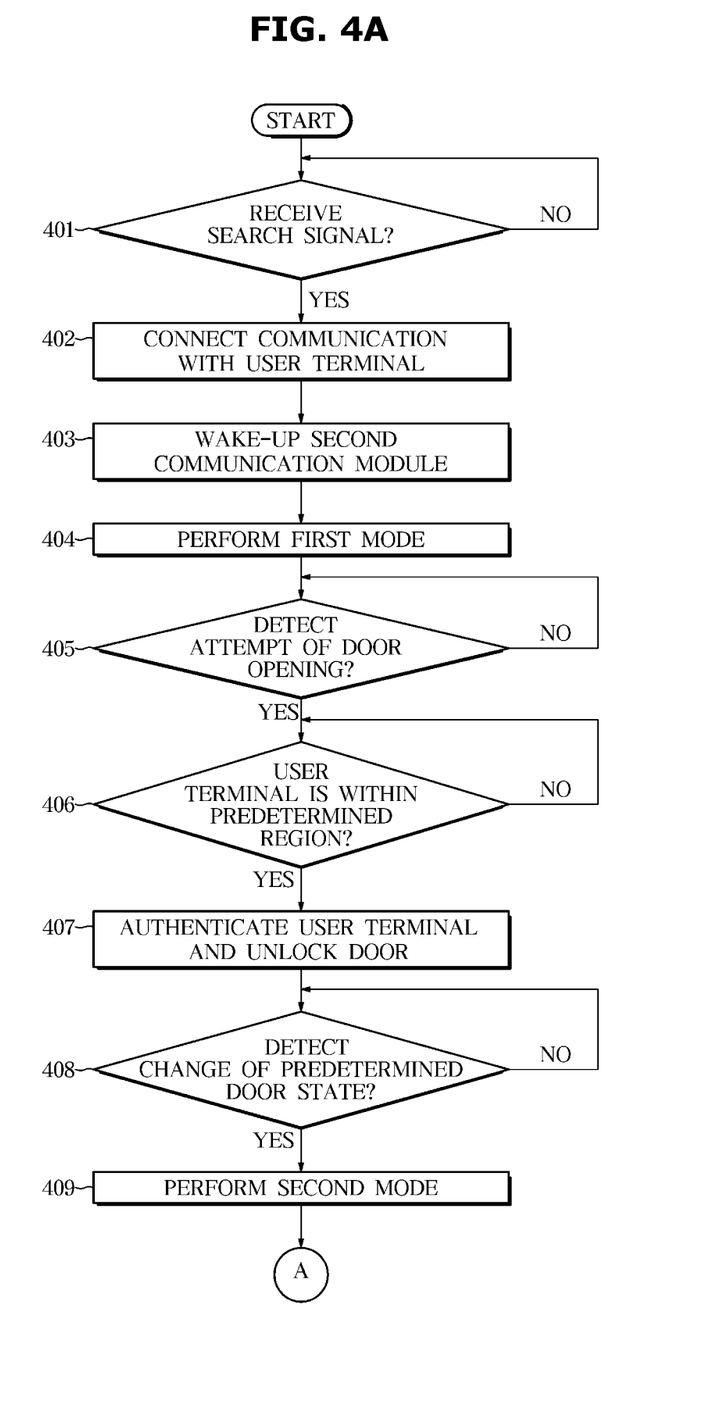
FIG. 4A to FIG. 4B are flowcharts illustrating a method of controlling a vehicle.
Figure 4B:
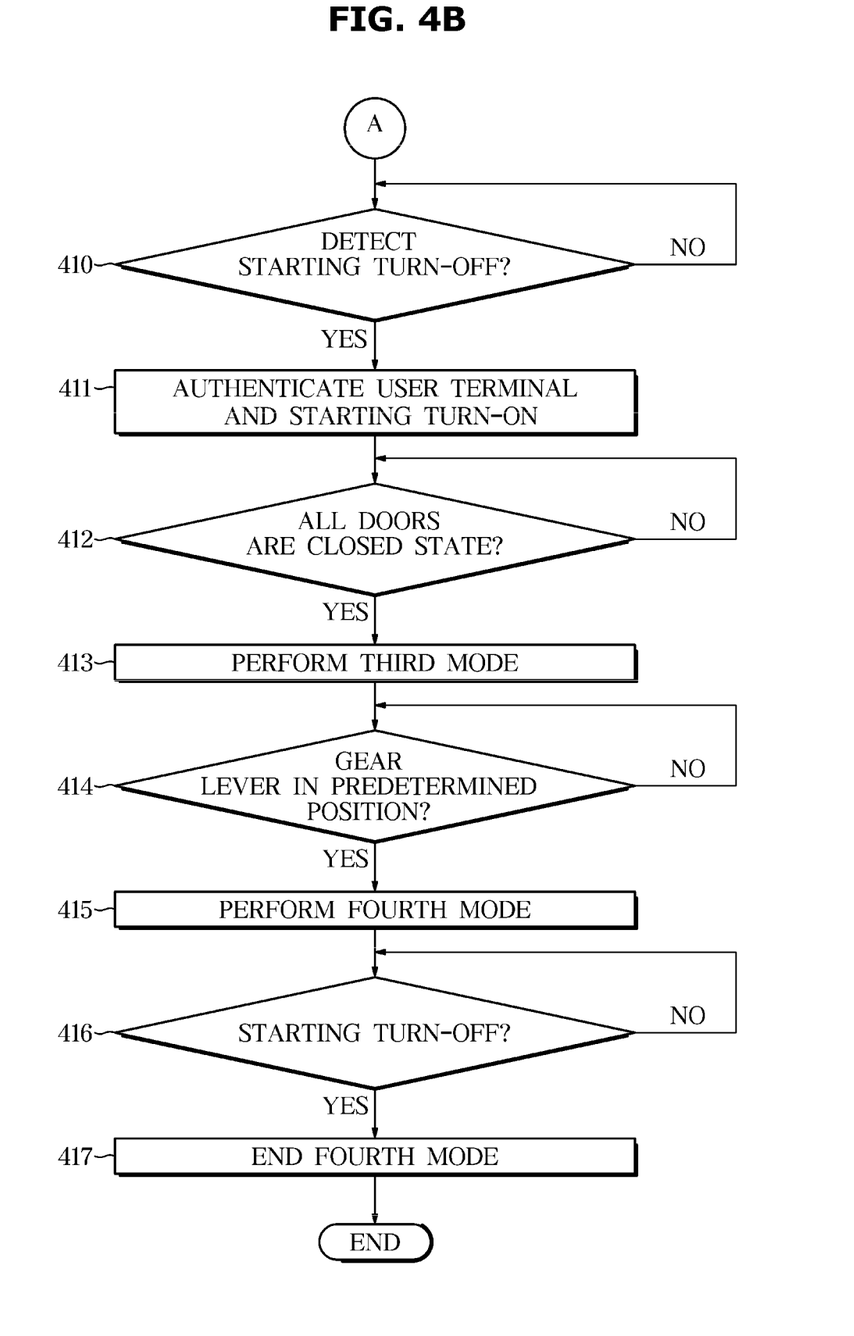

FIG. 4A to FIG. 4B are flowcharts illustrating a method of controlling a vehicle.

Referring to FIG. 4A, and FIG. 4B, in some implementations, the vehicle 100 may determine whether a search signal is received (401). When the search signal is received (YES in 401), vehicle can connect a communication with the user terminal 200 (402). In this case, the vehicle 100 may perform authentication on the user terminal 200, and when the user terminal 200 is authenticated, the vehicle 100 may connect communication with the user terminal 200.

After receiving the search signal and communicating with the user terminal 200, the vehicle 100 may activate the second communication module 120 (403). In this case, the second communication module 120 may be implemented as a UWB communication module.

When the second communication module 120 is activated, the vehicle 100 may operate in the first mode. In this case, the first mode refers to an operation mode for determining the position of the user terminal 200 with respect to the outside of the vehicle.

In the first mode, the vehicle 100 may transmit a sensing signal to the outside of the vehicle and receive a reflection signal corresponding to the sensing signal from the user terminal 200. The vehicle 100 may determine the position of the user terminal 200 with respect to the outside of the vehicle based on the sensing signal and the reflected signal.

In order to perform the first mode, the vehicle 100 may activate the second communication modules 120a to 120e. In detail, the vehicle 100 may activate not only the second communication modules 120a, 120b, 120c, and 120d disposed outside the vehicle, but also the second communication module 120e disposed inside the vehicle.

However, the present disclosure is not limited thereto, and at this time, the vehicle 100 may activate only the second communication modules 120a, 120b, 120c, and 120d disposed outside the vehicle among the second communication modules 120a through 120e.

The vehicle 100 may determine whether a door opening attempt is detected (405). Specifically, the vehicle 100 may determine that the door opening attempt is detected when the handle 17L or 17R pulling operation is detected.

If a door opening attempt is detected (YES in 405), vehicle 100 may determine whether the location of user terminal 200 is within a predetermined area (406).

In this case, the predetermined area may mean an area in which the user is estimated to open the door for boarding the vehicle 100, and may be, for example, an area within a predetermined distance from the door.

When the location of the user terminal 200 is within a predetermined area (YES of 406), the vehicle 100 may authenticate the user terminal 200 and unlock the door (407). At this time, the vehicle 100 may unlock the door only when the user terminal 200 is authenticated.

When the door is unlocked, the vehicle 100 may determine whether a predetermined door state change is detected (408). In this case, the vehicle 100 may detect a state change of the door from the open state to the closed state, and for this purpose, the vehicle 100 may further include a door sensor.

When a predetermined door state change is detected (YES of 408), vehicle 100 may operate in a second mode (409). In this case, the second mode may be an operation mode for detecting a user terminal in the vehicle.

In detail, when the state of the door is changed from the closed state to the open state after the door is unlocked, the vehicle 100 may operate in the second mode.

In the second mode, the vehicle 100 may transmit a sensing signal to the inside of the vehicle and receive a reflection signal corresponding to the sensing signal from the user terminal 200. The vehicle 100 may determine the location of the user terminal 200 located inside the vehicle based on the sensing signal and the reflected signal.

Alternatively, the vehicle 100 may operate in the second mode when the door is unlocked when the position of the user terminal 200 is inside the vehicle and when the turn-off state is detected after a predetermined door state change is detected.

Specifically, after the door is unlocked, the state of the first door is switched from the closed state to the open state, and when the turn-off state is detected, the vehicle 100 may operate in the second mode.

After entering the second mode, the vehicle 100 may determine whether a start turn-on attempt is detected (410). Specifically, when the vehicle 100 detects an operation of the start button, it may be determined that the start turn on attempt is detected.

If a startup turn-on attempt is detected (Yes of 410), vehicle 100 may authenticate user terminal 200 and turn on startup (411). At this time, the vehicle 100 may turn on the start by attempting to turn on the start of the authenticated user by turning on the start only when the user terminal 200 is authenticated.

Next, the vehicle 100 may check whether all the doors are closed (412), and if all the doors are closed (YES of 412), the vehicle 100 may operate in a third mode (413). In this case, the third mode refers to a mode for acquiring information about a user inside the vehicle.

In the third mode, the vehicle 100 may transmit a sensing signal to the inside of the vehicle and receive a reflection signal corresponding to the sensing signal from the user. The vehicle 100 may detect a user inside the vehicle based on the sensing signal and the reflected signal, and may determine a state of the user including sleep or the like.

After entering the third mode, the vehicle 100 may determine whether the position of the gear lever is a predetermined position (414). For example, vehicle 100 can determine whether the gear lever is in the D (drive) or R (reverse) position.

If the position of the gear lever is a predetermined position (Yes of 414), the vehicle 100 may operate in a fourth mode for detecting an obstacle outside the vehicle (415). In this case, the fourth mode may mean a mode for detecting an obstacle outside the vehicle.

In the fourth mode, the vehicle 100 may transmit a sensing signal to the outside of the vehicle and receive a reflection signal corresponding to the sensing signal from an obstacle outside the vehicle. The vehicle 100 may determine the presence, location, and the like of an obstacle to the outside of the vehicle based on the sensing signal and the reflection signal.

Thereafter, the vehicle 100 may check whether the starting is turned off (416), and if the starting is turned off (Yes of 416), the vehicle 100 may end the fourth mode (417).

Through this, since a function suitable for various situations can be provided, the user's convenience can be increased.

Figure 5:
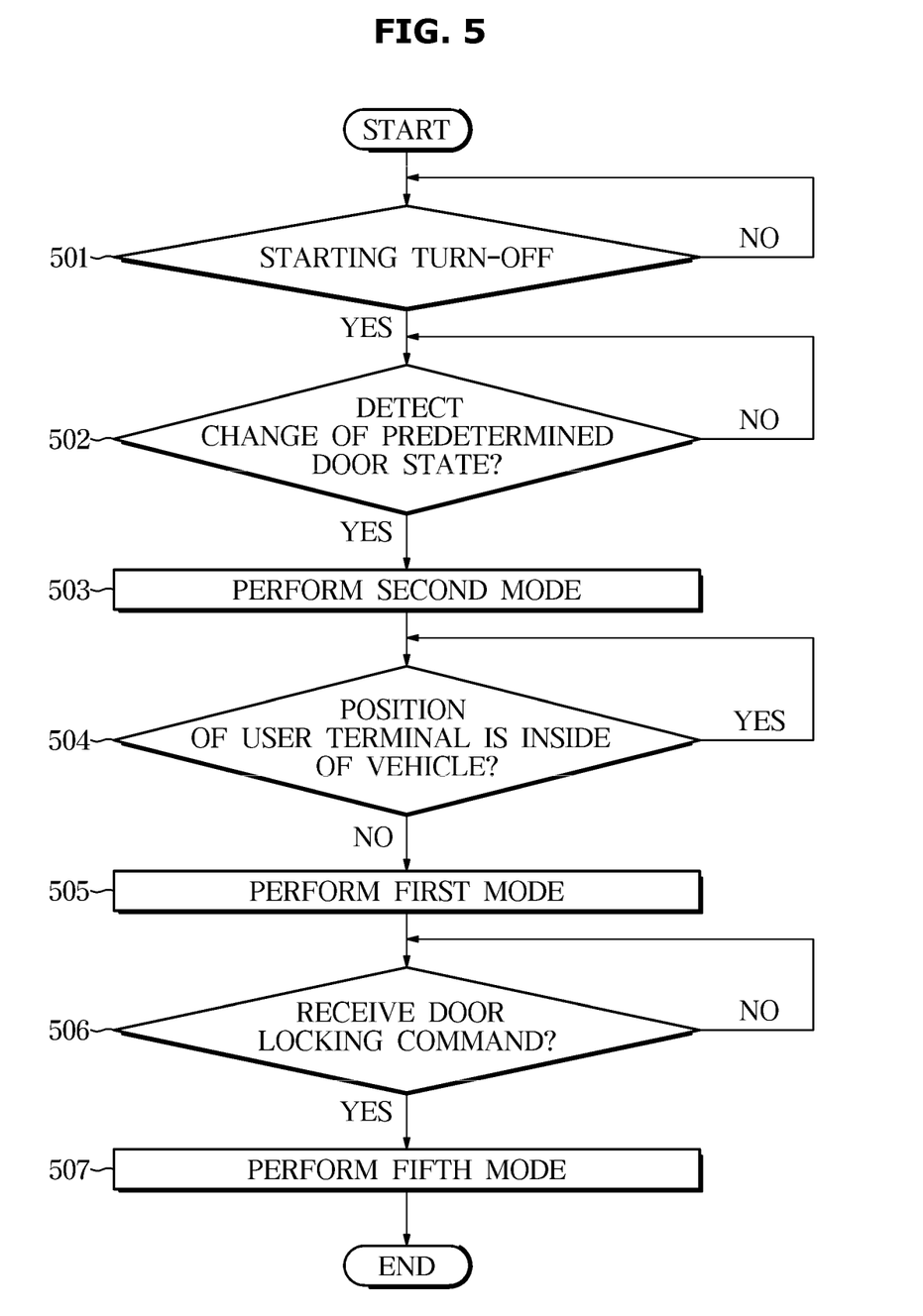
FIG. 5 is a flowchart illustrating a control method of a vehicle.

FIG. 5 is a flowchart illustrating a control method of a vehicle according to an exemplary embodiment.

Referring to FIG. 5, the vehicle 100 may determine whether the starting is turned off in the startup state (501).

When the starting is turned off (Yes of 501), the vehicle 100 may determine whether a predetermined door state change is detected (502). Specifically, the vehicle 100 may detect a state change of the door from the open state to the closed state, and for this purpose, the vehicle 100 may further include a door sensor.

When a predetermined door state change is detected (YES of 408), vehicle 100 may operate in a second mode (409). In this case, the second mode may be an operation mode for detecting the user terminal 200 inside the vehicle.

In detail, when the state of the door is changed from the closed state to the open state after the door is unlocked, the vehicle 100 may operate in the second mode. Thereafter, the vehicle 100 may determine whether the location of the user terminal 200 is inside the vehicle (504). When the location of the user terminal 200 is not inside the vehicle (NO in 504), that is, when the user terminal 200 is not detected inside the vehicle, the vehicle 100 may operate in the first mode (505). In this case, the first mode may be an operation mode for sensing the user terminal 200 outside the vehicle.

Thereafter, the vehicle 100 may check whether the door lock command is received (506), and when the door lock command is received (YES in 506), switch the state of the door to the locked state and operate in the fifth mode. In this case, the fifth mode may refer to a mode for detecting an intrusion inside the vehicle.

In a fifth mode, the vehicle 100 may transmit a sensing signal into the vehicle.

In a fifth mode, when a movement of an object inside the vehicle is detected, the vehicle 100 may determine that an invasion of the vehicle has occurred. If it is determined that an invasion of the vehicle has occurred, the vehicle 100 may send a warning to the user terminal 200 or control the starting device 142 to keep the starting turned off.

Through this, since theft of the vehicle 100 can be prevented, security and user convenience can be increased.

On the other hand, the disclosed embodiments and implementations may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

The computer-readable recording medium includes all kinds of recording media in which instructions that can be decoded by a computer. For example, there may be read only memory (ROM), random access memory (RAM), a magnetic tape, a magnetic disk, a flash memory, an optical data storage device, and the like.

As described above, the disclosed embodiments and implementations have been described with reference to the accompanying drawings. Although example embodiments of the disclosure have been shown and described, it would be appreciated by those skilled in the art that changes may be made to these embodiments without departing from the principles and spirit of the disclosure, the scope of which is defined in the claims and their equivalents.

According to the vehicle and the control method according to an aspect, since accurate position determination with respect to a user terminal or an external object can be performed, accuracy of remote control using the user terminal can be increased, and driving convenience can be increased.

What is claimed is:

1. A vehicle comprising:
   a first communication module configured to receive a search signal of a user terminal through a data channel having a first frequency band;
   a second communication module configured to send a sensing signal to an inside or an outside of the vehicle through a second frequency band and to receive a reflected signal corresponding to the sensing signal, wherein the second communication module utilizes UWB (Ultra Wide Band); and
   a controller configured to:
      wake up the second communication module when the first communication module receives the search signal,
      determine a position of the user terminal based on the sensing signal and the reflected signal, and
      control the second communication module to operate in an operation mode that is determined based on at least one of the position of the user terminal or a startup of the vehicle, wherein the operation mode includes a first mode for determining the position of the user terminal with respect to the outside of the vehicle, a second mode for determining the position of the user terminal with respect to the inside of the vehicle, a third mode for detecting a user in the vehicle, a fourth mode for detecting an obstacle outside the vehicle, and a fifth mode for detecting an intrusion into the vehicle.

2. The vehicle according to claim 1, wherein the controller is configured to determine the operation mode based on whether the user terminal is inside the vehicle, whether the vehicle is started, or whether a door of the vehicle is locked.

3. The vehicle according to claim 1, wherein, when the second communication module is activated and the position of the user terminal is outside of the vehicle and the vehicle is in a start-off state, the controller is configured to control the second communication module to operate in the first mode for determining the position of the user terminal with respect to the outside of the vehicle.

4. The vehicle according to claim 1, wherein when the position of the user terminal is inside of the vehicle and the vehicle is in a start-off state, the controller is configured to control the second communication module to operate in the second mode for determining the position of the user terminal with respect to the inside of the vehicle based on a door state.

5. The vehicle according to claim 1, wherein the controller is configured to control the second communication module to operate in the third mode for detecting a user in the vehicle when the position of the user terminal is inside of the vehicle and the vehicle is a start-on state.

6. The vehicle according to claim 5, wherein the controller is configured to:
send the sensing signal to the inside of the vehicle;
control the second communication module to receive the reflected signal corresponding to the sensing signal from the user; and
determine a state of the user in the vehicle based on the sensing signal and the reflected signal.

7. The vehicle according to claim 1, wherein when the position of the user terminal is outside of the vehicle, the vehicle is a start-off state, and a door is changed from an unlocked state to a locked state, the controller is configured to control the second communication module to operate in the fifth mode for detecting an intrusion into the vehicle.

8. The vehicle according to claim 1, wherein the controller is configured to authenticate the user terminal when the first communication module receives the search signal and to activate the second communication module when the user terminal is authenticated.

9. The vehicle according to claim 1, further comprising:
a door locking device;
wherein the controller is configured to authenticate the user terminal when the position of the user terminal is within a predetermined region, and to control the door locking device to unlock a door of the vehicle when the user terminal is authenticated.

10. The vehicle according to claim 9, further comprising:
a starting device;
wherein the controller is configured to determine whether the position of the user terminal is inside of the vehicle when the state of the door is changed from an open state to a closed state after the door is unlocked, and to control the starting device to start the vehicle when the position of the user terminal is inside of the vehicle.

11. The vehicle according to claim 1, wherein the first communication module utilizes BLE (Bluetooth Low Energy).

12. A vehicle comprising:
a first communication module configured to receive a search signal of a user terminal through a data channel having a first frequency band;
a second communication module configured to send a sensing signal to an inside or an outside of the vehicle through a second frequency band, and receive a reflected signal corresponding to the sensing signal; and
a controller configured to:
wake up the second communication module when the first communication module receives the search signal,
determine a position of the user terminal based on the sensing signal and the reflected signal, and
control the second communication module to operate in an operation mode that is determined based on the position of the user terminal or a startup of the vehicle, the operation mode for detecting an obstacle outside the vehicle based on a position of a gear lever when the position of the user terminal is inside of the vehicle and the vehicle is a start-on state.

13. A method of controlling a vehicle, the method comprising:
receiving, with a first communication module, a search signal of a user terminal through a data channel having a first frequency band;
waking-up a second communication module when the first communication module receives the search signal, wherein the second communication module utilizes UWB (Ultra Wide Band);
transmitting a sensing signal, through a data channel having a second frequency band, to an inside or an outside of the vehicle;
receiving a reflected signal corresponding to the sensing signal;
determining a position of the user terminal based on the sensing signal and the reflected signal; and
operating in an operation mode that is determined based on the position of the user terminal or a startup of the vehicle, wherein the operation mode includes a first mode for determining the position of the user terminal with respect to the outside of the vehicle, a second mode for determining the position of the user terminal with respect to the inside of the vehicle, a third mode for detecting a user in the vehicle, a fourth mode for detecting an obstacle outside the vehicle, and a fifth mode for detecting an intrusion into the vehicle.

14. The method according to claim 13, wherein operating in the operation mode comprises determining the operation mode based on whether the user terminal is inside the vehicle, whether the vehicle is started, or whether a door of the vehicle is locked.

15. The method according to claim 13, wherein performing the operation mode comprises, when the second communication module is activated, the position of the user terminal is outside of the vehicle, and the vehicle is in a start-off state, operating in the first mode for determining the position of the user terminal with respect to the outside of the vehicle.

16. The method according to claim 13, wherein performing the operation mode comprises, when the position of the user terminal is inside of the vehicle and the vehicle is in a start-off state, operating in the second mode for determining the position of the user terminal with respect to the inside of the vehicle based on a door state.

17. The method according to claim 13, wherein operating in the operation mode comprises operating in the third mode for detecting a user in the vehicle when the position of the user terminal is inside of the vehicle and the vehicle is a start-on state.

18. The method according to claim 13, wherein operating in the operation mode comprises operating in the fourth mode for detecting an obstacle outside the vehicle based on a position of a gear lever when the position of the user terminal is inside of the vehicle and the vehicle is a start-on state.

19. The method according to claim 13, wherein performing the operation mode comprises, when the position of the user terminal is outside of the vehicle, the vehicle is a start-off state, and a door is changed from an unlocked state to a locked state, operating in the fifth mode for detecting an intrusion into the vehicle.

20. The method according to claim 13 further comprising authenticating the user terminal when the position of the user terminal is within a predetermined region and unlocking a door of the vehicle when the user terminal is authenticated.

\* \* \* \* \*